T. DAY, Jr.
VEHICLE.
APPLICATION FILED MAY 7, 1917.
1,325,353.
Patented Dec. 16, 1919.
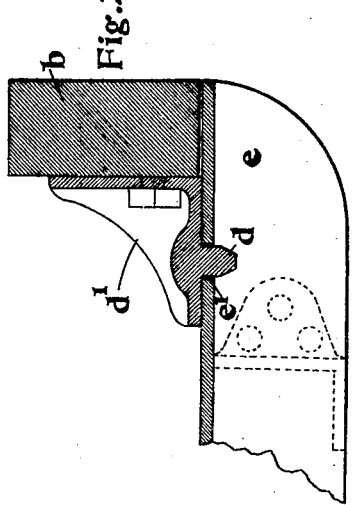
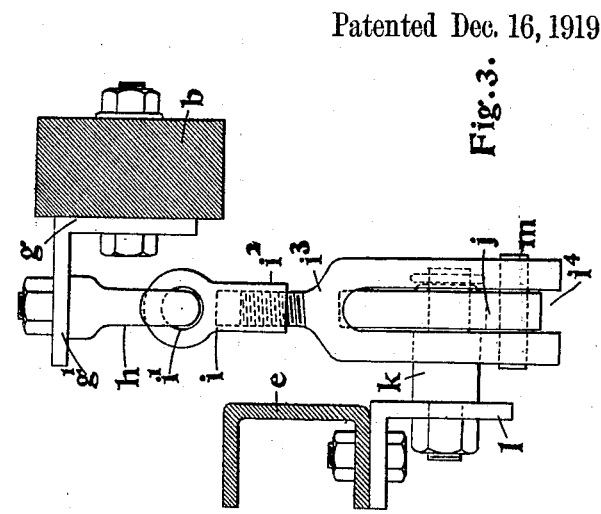
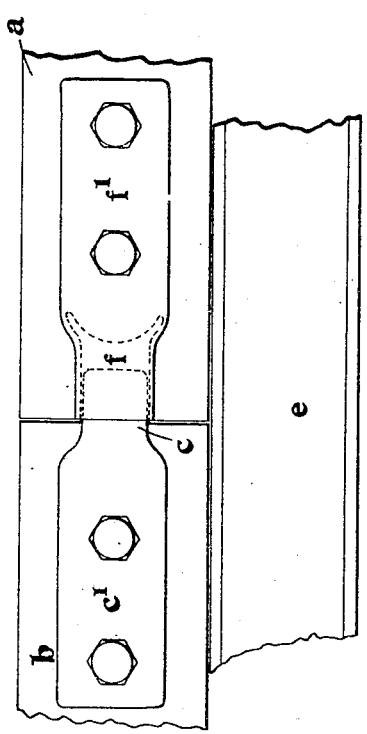
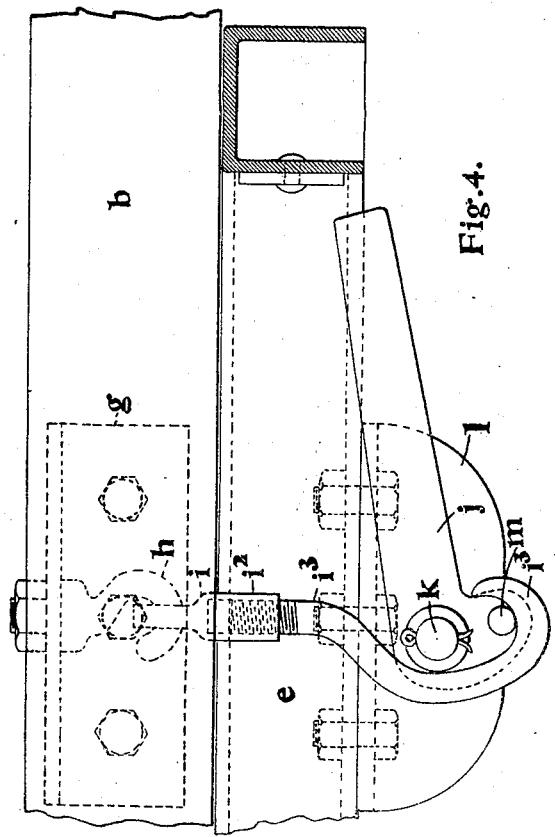
Inventor
Thomas Day Jun.
by
W. R. Evans
Attorney.

UNITED STATES PATENT OFFICE.

THOMAS DAY, JR., OF OKEHAMPTON, ENGLAND, ASSIGNOR OF ONE-THIRD TO THOMAS DAY AND ONE-THIRD TO ETHEL WEBB, BOTH OF OKEHAMPTON, ENGLAND.

VEHICLE.

1,325,353.  Specification of Letters Patent.  Patented Dec. 16, 1919.

Application filed May 7, 1917. Serial No. 167,148.

*To all whom it may concern:*

Be it known that I, THOMAS DAY, Jr., a subject of the King of Great Britain and Ireland, residing at New Road, Okehampton, England, have invented certain new and useful Improvements Relating to Vehicles, of which the following is a specification.

This invention has for its object to provide simple and effective means to secure detachable bodies of motor vehicles to the chassis or frames thereof in such manner that they may be readily exchanged, and without the employment of nuts and bolts or any other similar fastenings.

According to the invention the detachable body or detachable body part is provided with locating pins or devices in convenient positions as for example at the front and rear, by means of which the body or body part may be placed in its proper position upon the chassis or frame, and the chassis or frame is provided with a cam lever at the side or in other determined positions for engagement with a depending shackle or other member carried in a corresponding position upon the body so that upon the cam lever engaging the shackle or member aforesaid and being moved, pressure is applied upon the shackle whereby the body or body part is secured with pressure upon the frame or chassis.

The invention may be carried into effect in various ways. It may be applied to complete detachable bodies or to partially detachable bodies. The application of the invention does not affect the pedals or controls. Generally the bodies of motor vehicles are separate from the dashboard but where required the body can be cut in a convenient position in front of the heel board of the front seat. By such means two or more bodies may be used upon the same chassis or frame and may be readily and quickly exchanged while the body may conveniently be removed for the purpose of cleaning or attention to the parts lying upon or beneath the chassis.

The invention is illustrated in the accompanying drawings in which—

Figure 1 illustrates means for connecting the rear removable part of the body to the fixed front part thereof.

Fig. 2 illustrates in section means for setting the movable body at the rear.

Fig. 3 represents in end elevation and Fig. 4 in side elevation the means employed according to the invention for securing the removable body or body part with pressure upon the frame or chassis after it has been set thereon.

In carrying the invention into effect as illustrated in the accompanying drawings, the body may be cut in two parts as illustrated in Fig. 1 for example six inches in front of the heel board of the front seat, $a$ in Fig. 1 indicating the fixed front part of the body and $b$ the rear movable part thereof. The detachable part $b$ of the body may be set in its proper position by means of locating pins such as $c$, Fig. 1, one being provided on each side of the fixed part of the car body and by locating pins such as $d$, Fig. 2, which pass within corresponding holes $e^1$ in the chassis or frame $e$. The two locating pins $c$ in front are provided with corresponding socket parts $f$. The pin $c$ is advantageously integrally provided on a plate $c^1$ secured to the body $b$ while the socket part $f$ is similarly integrally provided with a plate $f^1$ secured by bolts to the fixed body $a$, while the pin $d$ may be integrally formed upon an angle plate $d^1$ secured to the detachable body $b$ and may be provided with a conical end to facilitate its entry into the hole.

At the side of the exchangeable body $b$ and on the inner face of the respective longitudinal members an angle bracket $g$ is secured for the reception on its extending flange $g^1$ of a hook $h$ which engages the eye $i^1$ of a shackle or depending member $i$. This shackle or depending member $i$ may be formed in two parts $i^2$ $i^3$, the upper part $i^2$ serving as a screwed socket for the lower part which is provided as a forked hook $i^3$. When the body $b$ is secured in its proper position upon the frame $e$ this forked hook $i^3$ lies adjacent to a cam lever $j$. This cam lever $j$ is pivotally mounted upon a pin $k$ carried by an angle plate $l$ secured on the under side of the chassis or frame $e$ and the cam lever $j$ consists of a long and a short arm. At the end of the short arm a cam pin $m$ is provided which protrudes upon each side of the arm. The lever $j$ is disposed within the central recess $i^4$ of the forked part $i^3$ so that on movement of the lever $j$ the cam pin $m$ engages the forked hook and draws down the shackle $i$, thus applying considerable pressure upon the body *b* against the chassis or frame *e*.

It will be understood that by the provision of the shackle or depending member *i* in two parts one of which is screw threaded in the other, provision is made in a simple way for the adjustment of the pressure to be applied.

It will be understood that the cam lever may take any other suitable form and that the cam lever and the shackle or depending member may be mounted in any convenient position as may be required.

Any suitable means may be provided for setting the body or body part in its proper position upon the chassis or frame without departing from the invention. Furthermore the cam or operating lever may be mounted upon the body and the shackle upon the chassis or frame.

I claim:—

1. In vehicles, means for securing a detachable body in position upon the chassis, comprising loosely mounted depending members or shackles mounted upon each side of the body and having their hook-shaped ends lowermost, and locking levers mounted on the chassis in positions corresponding to the position of the depending members or shackles upon the body, the said levers being disposed adjacent and parallel to the longitudinal sides of the chassis and adapted to engage the hook-shaped ends of the said depending members or shackles, substantially as described.

2. In vehicles, means for securing a detachable body in position upon the chassis, comprising loosely mounted depending members or shackles mounted upon each side of the body and having their hook-shaped ends lowermost, and locking levers mounted on the chassis in positions corresponding to the position of the depending members or shackles upon the body, the said levers being disposed adjacent and parallel to the longitudinal sides of the chassis and adapted to engage the hook-shaped ends of the said depending members or shackles, and means for setting the detachable body of the vehicle in position upon the chassis, substantially as described.

THOMAS DAY, Jun.